INVENTORS
OTTO LOUIS VAN STEENIS, Deceased
by JORIS DANIEL HEIJLIGERS, Executor
WILHELMUS ANTONIUS ROOVERS
BY
AGENT _United States Patent Office_

2,835,853
Patented May 20, 1958

2,835,853

SEMI-CONDUCTOR ELECTRODE SYSTEM

Wilhelmus Antonius Roovers, Emmasingel, Eindhoven, Netherlands, and Otto Louis Van Steenis, deceased, late of Emmasingel, Eindhoven, Netherlands, by Joris Daniel Heijligers, executor, Emmasingel, Eindhoven, Netherlands, assignors, by mesne assignments, to North American Philips Company, Inc., New York, N. Y., a corporation of Delaware Application December 7, 1954, Serial No. 473,680

Claims priority, application Netherlands December 19, 1953

3 Claims. (Cl. 317—236)

The invention relates to electrode systems, more especially but not exclusively for use in crystal diodes or transistors housed in a tubular glass envelope through the wall of which a number of supports is sealed, and which contains a semi-conductor body. It is known to solder this semi-conductor to one end of the support. Because of the sensitivity of the semi-conductor to high temperatures and the risk of melting of the solder, it is necessary for the semi-conductor to be provided at a comparatively large distance from the seal of the support, with the result that the assembly will have a considerable length.

The present invention has inter alia for its object to provide a construction permitting the semi-conductor to be located very closely adjacent to the seal. In this construction, moreover, the heat developed in the said member due to the passage of current is dissipated more readily.

In accordance with the invention, the semi-conductive member is soldered to a metal disc, which, in turn, is soldered to an end of a support, extending into the envelope along the axis of the tubular envelope, whereas the disc extends at right angles to the said axis.

The solder by means of which the semi-conductor is secured to the disc may have a melting point exceeding that of the solder used for securing the disc to the support. The first mentioned solder may, for example, be pure tin, the last-mentioned may be an alloy of 40% tin and 60% lead or an alloy of 60% tin and 40% lead.

In a suitable embodiment, the surface area of the disc exceeds that of the semi-conductor. This step aims at a satisfactory evacuation of heat during the soldering operation. To this end the disc may alternatively comprise tags resting against the inner wall of the envelope.

In carrying the invention, a support is arranged in line with the axis of a tubular glass envelope and sealed partly into the latter, a metal disc, which carries a semi-conductor on its side remote from the support, subsequently being soldered to the end of the metal support.

In soldering the disc to the support, the latter is preferably heated beforehand to a temperature exceeding that of the disc, and during the soldering operation the disc may be held in contact with means for carrying off the heat.

In order that the invention may be readily carried into effect it will now be described, by way of example, with reference to the accompanying drawing which represents embodiments thereof and in which.

Figure 1:
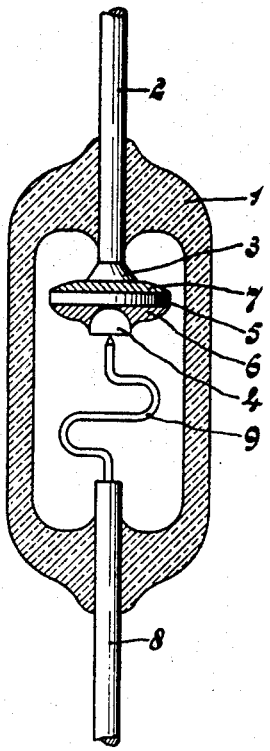
Figs. 1 and 2 are sectional views of two crystal diodes on an enlarged scale.

The crystal diode shown in Fig. 1 is housed in a tubular glass envelope 1. Sealed into the said envelope is a support 2, in this case a conductor, which extends in line with the axis of the envelope 1 and is provided with a head 3 at its end within the envelope. A semi-conductor body 4, for example germanium or silicon, is secured to a metal disc 5 by means of solder 6 such, as, for example, tin. The disc 5 is in its turn soldered to the head 3 of the support 2. This may be effected by means of solder 7 having a melting point lower than that of tin, for example an alloy consisting of 60% tin and 40% lead. If the head 3 of the support is previously tinned and subsequently carefully cleaned, while also the disc 5 with the semi-conductor and the solders 6 and 7 are carefully pickled, attachment of the disc to the support can be effected without the semi-conductor being contaminated by the fluxes commonly used in soldering.

A support 8 carrying a cat's whisker (point electrode) 9 engaging and thus coupled to the semi-conductor body 4 is sealed in at the lower end of the envelope 1. As will be evident, the conductors 2 and 8 constitute the external terminals for the electrode system shown.

Figure 2:
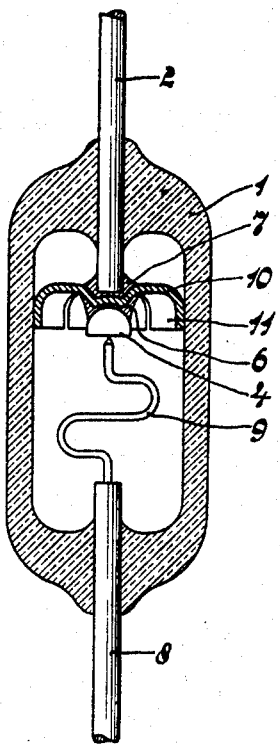

Fig. 2 shows a similar construction which is different from that shown in Fig. 1 by the use of a disc 10 which is substantially cup-shaped and provided with peripheral tags 11 resting against the inner wall of the envelope. Thus the robustness is increased and the heat developed in the semi-conductor is dissipated more readily.

The bottom of the disc 10 is elevated so that the semi-conductor 4 partly protrudes below the edges of the tags 11 and can be better surface-ground, while at the upper side a cavity is formed which embraces the end of the support 2 to a greater or lesser degree and yields a firmer attachment.

Figure 3:
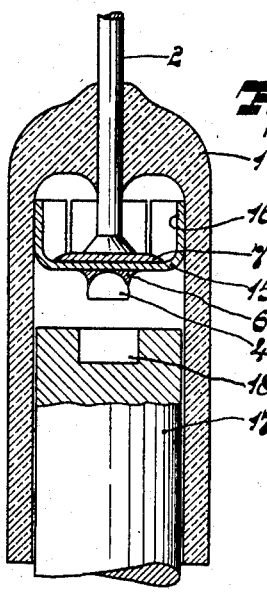
Fig. 3 shows a third embodiment in the course of manufacture.

The construction shown in Fig. 3 differs from the preceding constructions in that the disc 15 comprises upwardly bent tags 16 which permit the semi-conductor 4 to be surface-ground in a simpler manner.

The metal discs (5, 10 or 15) are preferably secured in position by heating the upper end of the envelope 1 with the support 2 to a temperature exceeding that at which the solder 7 melts and subsequently pressing the disc, which has been provided with such solder, against the inner end of the support 2 by means of a cold punch 17 (Fig. 3). The said punch should be in intimate thermal relation with the disc and for this purpose it is provided with cavity 18 accommodating the semi-conductor.

The disc (5, 10 or 15) may alternatively be secured to the support 2 by causing the solder to melt electrically. In this case, the punch 17 and the support 2 may be connected to the terminals of a current supply, for example a charged capacitor, the charge supplied then being so chosen as to just cause the solder to melt.

It is to be noted that in this context the term "glass envelope" is to be understood to include ceramic material. The conductors may be sealed into such an envelope by means of enamel or metal, for example silver.

What is claimed is:

1. A semi-conductor electrode system comprising a tubular vitreous envelope having a central axis, a conductor substantially extending along the axis of the envelope and sealed in and through an end wall of said envelope, a metallic disc-like member disposed within the envelope and extending substantially in a plane at right angles to the envelope axis, a semi-conductor body, first solder means securing one side of said disc-like member to the end of said conductor, second solder means securing said semi-conductor body to the other side of said disc-like member, said second solder means having a substantially higher melting point than said first solder means, and means sealed in the other end of the envelope and coupled to said semi-conductor body for providing together with said conductor external terminals for said system.

2. A semi-conductor electrode system as set forth in claim 1 wherein the disc-like member is substantially larger than said semi-conductor body.

3. A semi-conductor electrode system as set forth in claim 2 wherein the disc-like member includes a plurality of projections extending from the periphery thereof and engaging the inner wall of said envelope.

References Cited in the file of this patent

UNITED STATES PATENTS

| | | |
|---|---|---|
| 2,626,985 | Gates | Jan. 27, 1953 |
| 2,632,042 | Fitchett | Mar. 17, 1953 |
| 2,664,528 | Stelmak | Dec. 29, 1953 |
| 2,666,874 | Barton | Jan. 19, 1954 |
| 2,682,022 | Doran | June 22, 1954 |
| 2,697,806 | Gates | Dec. 21, 1954 |
| 2,699,594 | Bowne | Jan. 18, 1955 |